Sept. 7, 1943.  R. W. BLUCKE  2,328,776
CAPACITOR CONSTRUCTION
Filed June 12, 1941  2 Sheets-Sheet 1

Inventor:
Rudolph W. Blucke
By Brown, Jackson, Boettcher, Dienner
Att'ys

Sept. 7, 1943.  R. W. BLUCKE  2,328,776
CAPACITOR CONSTRUCTION
Filed June 12, 1941  2 Sheets-Sheet 2
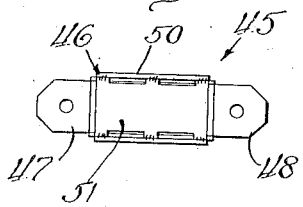
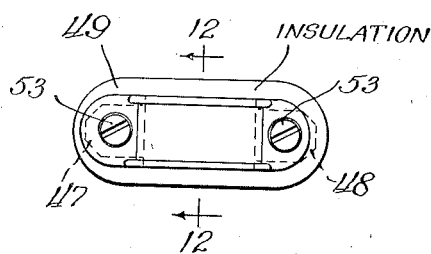
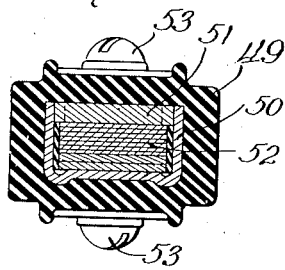
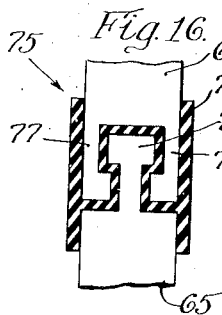
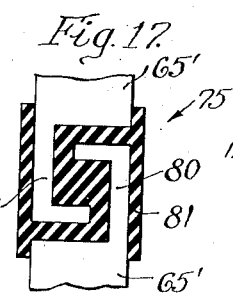
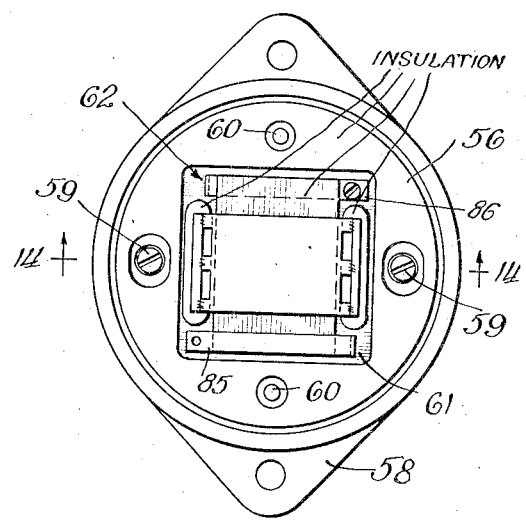
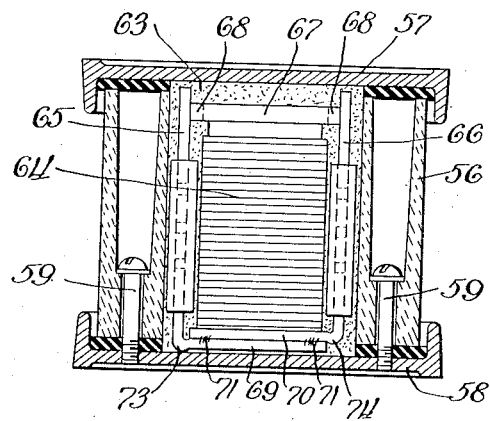
Inventor:
Rudolph W. Blucke Patented Sept. 7, 1943

2,328,776

UNITED STATES PATENT OFFICE 2,328,776

CAPACITOR CONSTRUCTION

Rudolph W. Blucke, Springfield, Ill., assignor to Sangamo Electric Company, Springfield, Ill., a corporation of Illinois Application June 12, 1941, Serial No. 397,657

10 Claims. (Cl. 175—41)

My invention relates, generally, to the construction of capacitors and it has particular relation to the provision of improved means for holding the stack of capacitor plates under pressure.

An object of my invention is to provide for holding the plates of a capacitor stack under pressure in such manner that a minimum of space is required for the completed capacitor.

Another object of my invention is to provide a frame construction for a capacitor stack which will hold the same under pressure.

A further object of my invention is to complete the frame for a capacitor stack by welding under heat and pressure.

Still another object of my invention is to form a metallic frame about a capacitor stack to hold the same under pressure and then to mold a casing of insulation about the frame and capacitor stack.

It is also an object of my invention to insulate portions of the frame surrounding a capacitor stack so that opposite sides thereof will be electrically disconnected but will be mechanically interconnected to hold the capacitor stack under pressure.

Other objects of my invention will, in part, be obvious and in part appear hereinafter.

For a more complete understanding of the nature and scope of my invention reference can be had to the following detailed description taken in connection with the accompanying drawings in which:

Figure 10 is a top plan view of a modified form of the capacitor construction shown in Figures 7 and 8;

Figure 11 is a top plan view of the capacitor construction shown in Figure 10 assembled in a casing of insulation;

Figure 12 is a sectional view, at an enlarged scale, taken along the line 12—12 of Figure 11;

Figure 13 is a top plan view of another embodiment of my invention showing a frame construction that is particularly applicable for capacitors connected in high voltage circuits, the upper terminal plate having been removed;

Figure 14 is a detail sectional view taken along the line 14—14 of Figure 13;

Figure 15 is a fragmentary view of one of the frame sections used in the construction shown in Figures 13 and 14;

Figures 16 shows one form of insulated joint that can be used for the frame construction; and Figure 17 shows another form of insulated joint construction that can be used.

Figure 1:
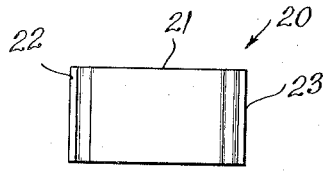
Figure 1 is a top plan view of a C-shaped frame member which forms a part of a frame for holding a capacitor stack under pressure.
Figure 2:
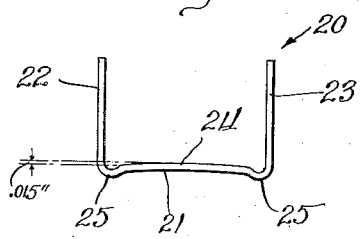
Figure 2 is a view, in side elevation, of the frame member shown in Figure 1.

Referring now particularly to Figures 1 and 2 of the drawings it will be observed that the reference character 20 designates, generally, a generally C-shaped metallic frame member having an intermediate side portion 21 and end portions 22 and 23 forming two sides and the intermediate portion 21 forming a third side of a metallic frame. As shown, the intermediate portion 21 is bowed inwardly, as indicated at 24, and the end portions thereof where they join the side or end portions 22 and 23 are curved sharply outwardly to form the transversely extending resilient grooves or troughs indicated at 25. As will be apparent hereinafter, the intermediate portion 21 is bowed inwardly in order to apply pressure to a capacitor stack in the frame. The spring grooves 25 extend across the entire width of the stamping and are curved sharply so as to increase the pressure that is applied and to prevent the intermediate portion 21 from buckling outwardly. The intermediate portion 21 is bowed inwardly, as indicated at 24, only a slight amount, for example, it is bowed inwardly about .015 inch, as shown.

Figure 3:
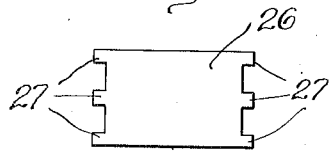
Figure 3 is a top plan view of a frame plate that is used for completing the frame, part of which is shown in Figures 1 and 2.
Figure 4:
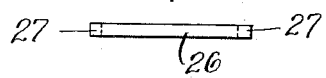
Figure 4 is a view, in side elevation, of the frame plate shown in Figure 3.

In Figures 3 and 4 of the drawings the fourth side of the frame is shown at 26. This comprises a metallic plate member having projections 27 at its ends to facilitate welding by heat and fusion to the outer end portions of the sides 22 and 23 of the frame 20.

Figure 5:
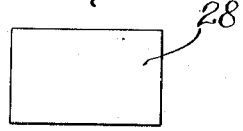
Figure 5 is a top plan view of a bottom plate for the capacitor stack.
Figure 6:
Figure 6 is a view, in side elevation, of the plate shown in Figure 5.

In Figures 5 and 6 of the drawings there is shown a bottom plate 28 which is intended to be placed upon the intermediate side portion 21 underneath the capacitor stack.

Figure 7:
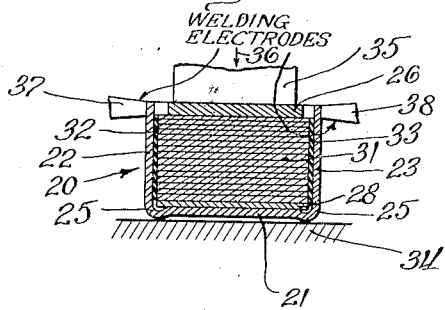
Figure 7 is a detail sectional view of a capacitor stack and frame assembled in accordance with my invention.
Figure 8:
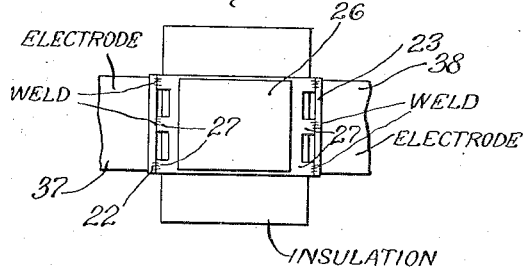
Figure 8 is a top plan view of the assembly shown in Figure 7.

In Figures 7 and 8 of the drawings a capacitor stack 31 is indicated somewhat schematically as being positioned in the generally rectangular frame provided by the C-shaped frame member 20 and the top plate 26. It will be understood that the capacitor stack 31 is formed by capacitor plates that are held in spaced relation by suitable insulation. Since the details of construction of the capacitor plates and the insulation therebetween are well known to those skilled in the art, they will not be further discussed or illustrated herein. Plates 32 and 33 of suitable insulating material, such as mica, are placed on opposite sides of the capacitor stack 31 so as to insulate it from the metallic frame surrounding it.

The entire assembly is placed on a suitable support 34 and a head 35 from a suitable pressure applying device is moved downwardly as indicated by the arrow 36 so as to apply pressure to the capacitor stack 31 and move it downwardly firmly into engagement with the bottom plate 28 on the intermediate portion 21. Sufficient pressure is applied so as to flatten or straighten out the inwardly bowed intermediate portion 21 so that when the pressure is released, after the formation of the frame has been completed, the capacitor stack 31 will be maintained under a predetermined pressure and hence will maintain its calibration.

Welding electrodes 37 and 38 are moved into engagement with opposite sides of the frame 20 as shown and in alignment with the top plate 26. It will be understood that the welding electrodes 37 and 38 are moved toward each other under sufficient pressure and sufficient current is caused to flow therebetween as to melt the end portions 27 of the top plate 26 and deform them somewhat as the adjacent end portions of the sides 22 and 23 are moved inwardly so that on cessation of current flow the abutting ends will have been welded together securely.

It will be apparent that, when a capacitor stack is enclosed in a frame as described hereinbefore and illustrated in the drawings, it requires a minimum of space and the parts are firmly secured together. Further, the construction just described is comparatively simple in design and can be readily manufactured on a mass production basis.

Figure 9:
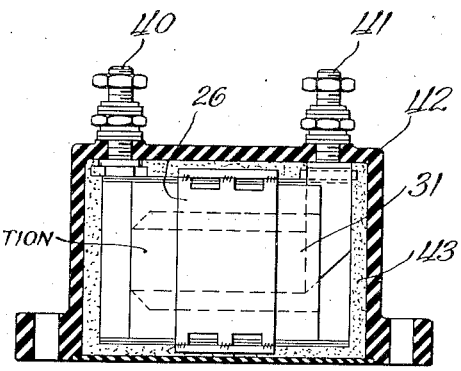
Figure 9 is a detail sectional view of a completed capacitor stack assembled in a frame and the combination assembled in a housing of insulation.

As shown in Figure 9 of the drawings, the capacitor as assembled with the welded frame construction is provided with terminal members 40 and 41 of conventional design which project through a housing 42 of suitable insulating material. The capacitor stack 31 is securely held in place in the housing 42 by a suitable compound 43 which is melted by application of heat thereto and is poured into the housing 42 where on cooling it solidifies.

In Figures 10 and 11 of the drawings there is shown a capacitor construction which employs the frame details described hereinbefore. The capacitor stack and frame are indicated generally at 45, the frame being indicated generally at 46. Terminal members 47 and 48 extend from the capacitor stack to permit connection thereto. The assembly 45 has molded around it a casing 49 of insulating material, such as a phenolic condensation product. When the frame construction is employed as previously described only a relatively small amount of insulating material 49 is required for the casing since the design is compact and there are no frame portions laterally projecting therefrom which would otherwise require additional insulating material to cover them.

In Figure 12 of the drawings it will be observed that the details of construction follow those previously described. A generally C-shaped metallic frame member 50 has its ends welded to a metallic top plate 51. A capacitor stack 52 of metallic plates with insulation therebetween is located in the frame thus provided. Suitable terminal screws 53 permit connection to the capacitor stack 52.

In Figures 13 and 14 of the drawings another embodiment of my invention is illustrated. The capacitor construction shown in these figures is intended for use with circuits operating at relatively high voltages such as from 3000 to 6000 volts. The construction includes a tubular housing 56 that is formed of suitable insulating material, such as porcelain, and at its ends it has terminal members 57 and 58 which serve, not only as terminal members, but also for closing the ends of the insulating housing 56 and supporting the same. As shown in Figure 14 of the drawings, the lower terminal 58 is secured to the insulating housing 56 by means of screws 59. Suitable screws, not shown, are provided with bevelled heads for holding the top terminal 57 in place. These screws are threaded into nuts 60, Figure 13, which are leaded into suitable apertures in the insulating housing 56. In prior constructions reliance has been placed upon the screws holding the terminals 57 and 58 in place for applying a compressive force to the plates making up the capacitor stack. When the construction disclosed herein is employed this is unnecessary.

The insulating housing 56 is provided with a generally rectangular opening 61 therethrough for receiving the capacitor assembly which is shown generally at 62. After the capacitor assembly 62 has been located in the opening 61 the remaining space therein is filled with a suitable insulating compound 63 which is poured into place while hot and which, on cooling, solidifies.

The construction of the capacitor assembly 62 is generally the same as described hereinbefore. However, there are certain modifications in order to permit the use of the capacitor on high voltage circuits as will be set forth hereinafter.

The capacitor assembly 62 comprises a capacitor stack 64 of conventional construction comprising capacitor plates disposed in spaced relation and having insulation interposed therebetween. These plates are connected in various series and parallel combinations depending upon the capacity that is required. The end plates can be connected to the terminals 57 and 58 by suitable conductors 85 and 86, respectively, as shown in Figure 13.

The capacitor stack 64 is held under pressure by means of a metallic frame which comprises members 65 and 66 which, taken together, provide a generally C-shaped frame for three sides of the capacitor stack 64. A metal plate 67 having projecting portions 68, similar to the portions 27 of the plate 26, Figures 3 and 4, is welded, as previously described, to the upper ends of the members 65 and 66 while being held against the capacitor stack 64 under pressure. The metallic members 65 and 66 are generally L-shaped and have overlapping portions 69 and 70 that are secured together in any suitable manner such as by spot welding as indicated at 71. The intermediate portions or trough-shaped beads 73 and 74 between the end portions of the metallic members 65 and 66 are curved sharply outwardly so as to increase the compressive stress that is applied to the capacitor stack 64, as previously described. The bottom portions 69 and 70 of the metallic members 65 and 66 are bowed inwardly, as indicated in Figure 15, so as to further increase the compressive stress applied to the capacitor stack 64.

If the frame surrounding the capacitor stack 64 were formed entirely of metal, it will be obvious that it would be difficult to properly insulate the opposite end portions of the capacitor stack 64 from each other for high voltage operation. In order to insulate the upper and lower ends of the metallic frame surrounding the capacitor stack 64 insulated joints are provided in the upright portions of the metallic members 65 and 66.

The insulated joints that may be used are illustrated in Figures 16 and 17 of the drawings. In Figure 16 the joint is indicated generally at 75. It will be observed that the lower portion of the metallic member 65 is provided with a generally T-shaped upwardly extending portion 76 that interfits with a pair of downwardly extending L-shaped portions 77, the T and L-shaped portions 76 and 77 being spaced from each other. A filling of insulation 78, such as a phenolic condensation product or other similar material, is molded about the T and L-shaped portions 76 and 77 while they are held in spaced relation. On cooling the insulated joint construction 75 is formed which is capable of resisting considerable tension stress. At the same time the upper and lower portions of the metallic member 65 are suitably insulated from each other, and both of them are insulated from the edges of the metallic plates of the capacitor stack 64 along which they extend, and, furthermore, both of them are also spaced outwardly from these edges of the metallic plates of the capacitor stack a predetermined minimum distance determined by the thickness of the insulation 78.

Another form of insulated joint is illustrated generally at 75' in Figure 17 of the drawings. In this construction the upper and lower portions of the metallic member 65' are provided with interfitting L-shaped portions 79 and 80. A filling of insulation 81 is molded about the L-shaped portions 79 and 80 while they are held in spaced relation, as shown, to provide the insulated joint construction.

Since certain further changes can be made in the foregoing constructions and different embodiments of the invention can be made without departing from the scope thereof, it is intended that all matter shown in the accompanying drawings and described hereinbefore shall be interpreted as illustrative and not in a limiting sense.

I claim as my invention:

1. A capacitor comprising, in combination, a stack of metallic plates with insulation therebetween, and a generally rectangular metallic frame surrounding four sides of said stack and formed by two interfitting metallic members one being a flat plate and the other a substantially C-shaped member forming three of said four sides, said plate being secured to the outer ends of two of said three sides, the intermediate side of said C-shaped member being bowed inwardly and stressed outwardly to hold said stack under pressure and the ends of said intermediate side where they join the adjacent sides being formed with spring grooves which extend transversely across the entire width of said C-shaped member and which are curved sharply outwardly to reduce the tendency of said intermediate side to buckle outwardly under pressure.

2. A capacitor comprising, in combination, a stack of metallic plates with insulation therebetween; and a generally rectangular metallic frame surrounding four sides of said stack and formed by two interfitting metallic members one being a flat plate and the other forming three of said four sides, said plate being welded to the outer ends of two of said three sides, the intermediate side of said other metallic member being bowed inwardly a distance of approximately .015 inch and stressed outwardly to hold said stack under pressure and the ends of said intermediate side where they joint the adjacent sides being formed with resilient grooves which extend transversely across substantially the entire width of said intermediate side and which thave their convex side curved sharply outwardly to reduce the tendency of said intermediate side to buckle outwardly under pressure.

3. A capacitor comprising, in combination, a stack of metallic plates with insulation therebetween, clamp means for said stack formed by a generally C-shaped metallic member surrounding three sides of said stack, a metallic clamp plate extending along the fourth side of said stack and secured to the ends of said C-shaped metallic member, parts of the end portions of said C-shaped metallic member being disposed in spaced relation, and insulating means interconnecting said spaced parts whereby said clamp means does not electrically interconnect opposite sides of said stack, said insulating means also spacing said end portions of the C-shaped metallic member from the adjacent edges of the capacitor stack.

4. A capacitor comprising in combination, a stack of metallic plates with insulation therebetween, clamp means for said stack formed by a generally C-shaped metallic member surrounding three sides of said stack with the intermediate portion thereof bowed inwardly, a metallic clamp plate extending along the fourth side of said stack and secured to the ends of said C-shaped metallic member at such position that the bowed portion of said C-shaped member is stressed outwardly whereby said stack is held under pressure, parts of the end portions of said C-shaped metallic member being disposed in spaced relation, and insulating means interconnecting said spaced parts whereby said clamp means does not electrically interconnect opposite sides of said stack.

5. In a clamp for a capacitor of the class described comprising a stack of conductive plates with insulation therebetween, the combination of a U-shaped metallic stamping comprising a bottom portion, upwardly extending side arms and trough-shaped beads joining said bottom portion with said side arms, said bottom portion being originally formed with an upwardly bowed curvature of approximately .015 inch extending substantially from one of said trough-shaped beads to the other, said trough-shaped beads extending substantially across the entire width of said stamping and being curved downwardly below said upwardly bowed bottom portion, and a bridging plate extending between the upper portions of said side arms and welded thereto after the capacitor stack has been assembled in the clamp, said upwardly bowed bottom portion being stressed in a downward direction in the assembly of the capacitor stack in the clamp to maintain the stack under pressure.

6. In a clamp for a capacitor of the class described, the combination of a U-shaped member comprising a bottom portion, upwardly extending side arms and trough-shaped beads joining said bottom portion with said side arms, said bottom portion being originally formed with an upwardly bowed curvature extending substantially from one of said trough-shaped beads to the other, said trough-shaped beads extending across substantially the entire width of said U-shaped member substantially at right angles to the plane of said bowed curvature, and a bridging plate extending between the upper portions of said side arms and secured thereto on the upper side of the capacitor stack, said upwardly bowed bottom portion being stressed in a downward direction in the assembly of the capacitor stack in the clamp to maintain the stack under pressure.

7. In a clamp for a capacitor of the class described, the combination of two L-shaped stampings assembled together to form a U-shaped member, the bottom legs of said L-shaped stampings being assembled in overlapping relation to form the bottom portion of said U-shaped member and the side legs of said L-shaped stampings forming the upwardly extending side arms of said U-shaped member, said bottom portion of the U-shaped member being originally formed with an upwardly bowed curvature extending substantially from one of said side arms to the other, and a bridging plate extending between the upper portions of said side arms and secured thereto on the upper side of the capacitor stack, said upwardly bowed bottom portion of the U-shaped member being stressed in a downward direction in the assembly of the capacitor stack in the clamp to maintain the stack under pressure.

8. In a clamp for a capacitor of the class described, the combination of two L-shaped stampings assembled together to form a U-shaped member, the bottom legs of said L-shaped stampings being assembled in overlapping relation to form the bottom portion of said U-shaped member and the side legs of said L-shaped stampings forming the upwardly extending side arms of said U-shaped member, downwardly curved trough-shaped resilient beads formed in said L-shaped stampings between said bottom legs and said side legs, said bottom portion of said U-shaped member being originally formed with an upwardly bowed curvature extending substantially from one of said trough-shaped beads to the other, said trough-shaped beads extending substantially across the entire width of said stampings, and a bridging plate extending between the upper portions of said side arms and welded thereto after the capacitor stack has been assembled in said clamp, said upwardly bowed bottom portion being stressed in a downward direction in the assembly of the capacitor stack in the clamp to maintain the stack under pressure.

9. In a clamp for a capacitor of the class described, the combination of two L-shaped stampings assembled together to form a U-shaped member, said U-shaped member comprising a bottom portion, upwardly extending side arms, and trough-shaped beads joining said bottom portion with said side arms, said bottom portion being originally formed with an upwardly bowed curvature extending substantially from one of said trough-shaped beads to the other, said trough-shaped beads extending substantially across the entire width of said U-shaped member and being curved downwardly, and a bridging plate extending between the upper portions of said side arms and secured thereto on the upper side of the capacitor stack, said upwardly bowed bottom portion being stressed in a downward direction in the assembly of the capacitor stack in the clamp to maintain the stack under pressure.

10. In a clamp for a capacitor of the class described, the combination of a U-shaped member comprising a bottom portion, upwardly extending side arms, and trough-shaped beads joining said bottom portion with said side arms, said bottom portion being originally formed with an upwardly bowed curvature extending substantially from one of said trough-shaped beads to the other, a bridging plate extending between the upper portions of said side arms and secured thereto on the upper side of the capacitor stack, each of said side arms comprising metallic portions disposed in spaced relation, and insulating means interconnecting said spaced metallic portions whereby said clamp does not electrically interconnect opposite sides of said stack, said upwardly bowed bottom portion being stressed in a downward direction in the act of assembling the capacitor stack in the clamp whereby to maintain the stack under pressure.

RUDOLPH W. BLUCKE.